United States Patent
Shmelkin

[11] Patent Number: 5,672,134
[45] Date of Patent: Sep. 30, 1997

[54] SHMELKIN'S PLANETARY FLUID DYNAMIC COUPLING

[76] Inventor: Mark Shmelkin, P.O. Box 1003, Nesher, 20306, Israel

[21] Appl. No.: 534,075

[22] Filed: Sep. 26, 1995

[51] Int. Cl.⁶ .......................... F16H 47/12; F16H 47/04
[52] U.S. Cl. ........................ 475/111; 475/31; 475/112
[58] Field of Search .......................... 475/31, 32, 91, 475/111, 112, 254, 257, 267; 74/573 F

[56] References Cited

U.S. PATENT DOCUMENTS

| | | | |
|---|---|---|---|
| 323,390 | 6/1885 | Cancrinus et al. | 475/112 X |
| 2,139,301 | 12/1938 | Davey | 475/112 |
| 2,692,517 | 10/1954 | O'Hara | 475/112 |
| 3,302,489 | 2/1967 | Cancrinus et al. | 475/111 |
| 3,448,637 | 6/1969 | O'Hara | 475/112 |
| 3,495,480 | 2/1970 | Ruaud | 475/31 X |

FOREIGN PATENT DOCUMENTS 617323  2/1927  France ........................ 475/112

*Primary Examiner*—Khoi Q. TA

[57] ABSTRACT

A coupling consisted of a compound carrier mounted on a drive shaft and a ring gear mounted on a driven shaft. Axles, on which planet gears and hermetically sealed hollow drums with inner radial blades are secured rotate freely in the carrier bearings. The drums are partly filled a fluid. The planet gears are inside the ring gear and in ingagement with it. The driven shaft angle velocity ranges from 0 to the drive shaft angle velocity. The coupling transfers a continuously varying torque from the drive shaft to the driven shaft.

4 Claims, 2 Drawing Sheets

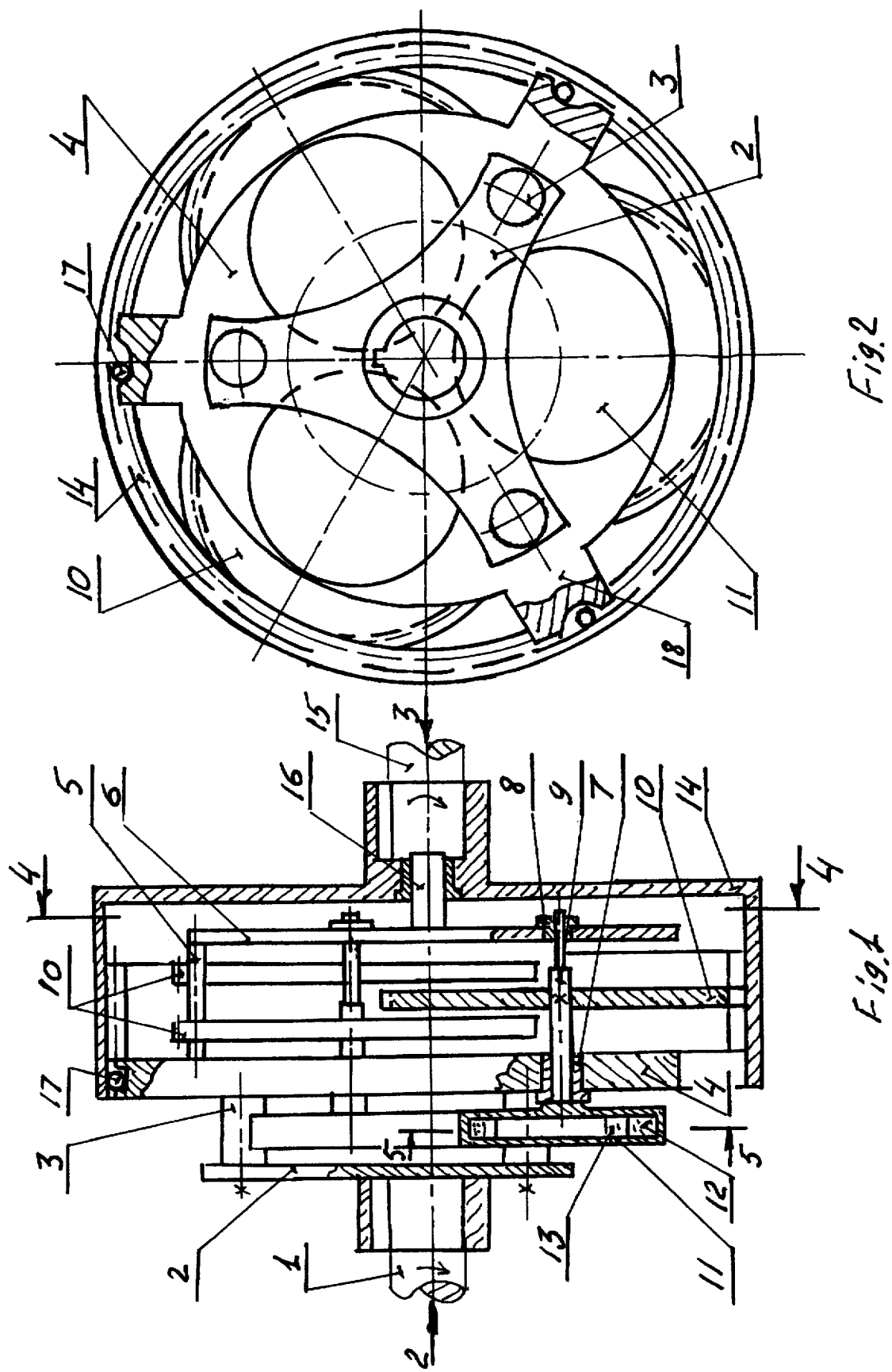

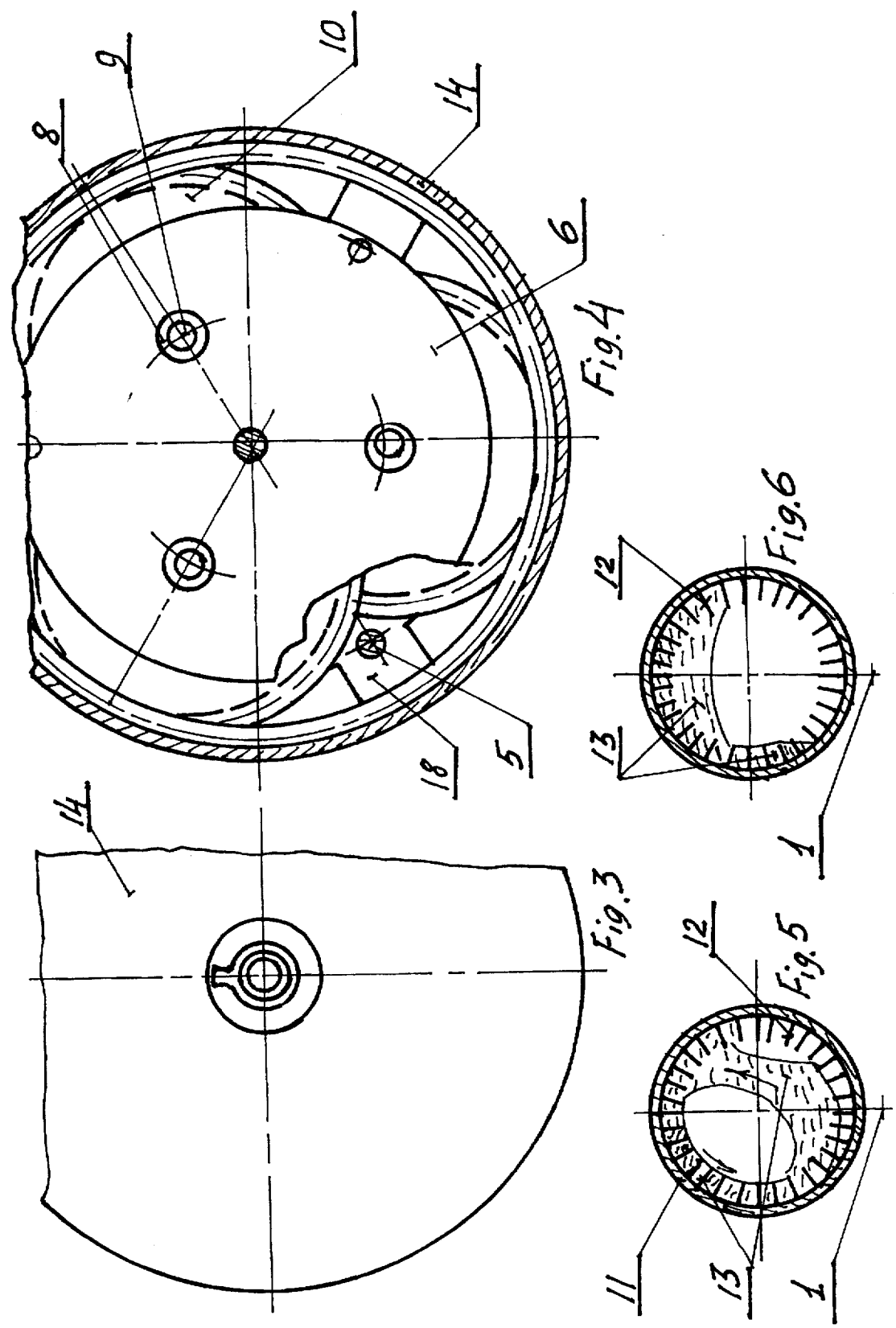

SHMELKIN'S PLANETARY FLUID DYNAMIC COUPLING

BACKGROUND OF THE INVENTION

The invention relates to the scope covering couplings transferring torque at different angle velocities of a drive and driven shafts. The characteristic property of such couplings is the continuous variation of a transferred torque from 0 to its maximum value when the drive shaft is speeding up from 0 to its maximum angle velocity. It enables continuous loading of an engine not depending on the load on the driven shaft. Conventional start fluid couplings are well known, see for example U.S. Pat. No. 4,143,561. They are widely applied for drives of turbomachines, heavy machines, conveyers, vehicles, etc. Their essential shortcomings are as follows:

a. The operating characteristic is such that the maximum torque is produced when the driven shaft is braked and the zero torque arises when the angle velocities of the drive and driven shafts are equal. As the consequence of the operating characteristic the overload of a motor may occur when the driven shaft is braked (starting overloads). Besides the angle velocity of the driven shaft never achieves that of the drive shaft (to keep the torque), so sliding takes place, its value being 8–10% of the constant angle velocity of the drive shaft. It results in lowering coupling efficiency and additional power consumption for normal operation when speeding-up the driven shaft is over.

b. A working fluid in a fluid coupling always circulates between two cavities rotating at different angle velocities. So the risk of leakage and coupling failure always exists.

c. A working fluid under an applied centrifugal force brings pressure to side walls of coupling cavities creating high axial thrusts. Built in thrust bearings needed for compensation of axial thrusts make the coupling more complicated and expensive.

The proposed invention is free of the above mentioned shortcomings and possesses the following advantages:

a. Depending on the extent of filling of hermetically sealed drums with a fluid the maximum torque may be produced in the whole range of the driven shaft angle velocities from 0 to the drive shaft angle velocity. Thus the starting overload of a motor can always be avoided by using an appropriate extent of the filling.

b. After the speed-up of the driven shaft its angular velocity is equal to that of the drive shaft (no sliding exists) and so there is no additional power consumption (100% efficiency).

c. The torque is produced as a result of fluid circulation inside the hermetically sealed drums so any risk of leakage is excluded.

d. Axial thrusts arising from fluid circulation inside the hermetically sealed drums are mutually compensated so no thrust bearings are needed.

e. The heat released in the drums is easily removed to air or another cooling medium. It must be noted that the coupling will function with 100% efficiency and the heat in the drums will not be liberated under normal operation conditions (when speeding-up the driven shaft is over).

SUMMARY OF INVENTION

The essence of the invention is as follows. A compound carrier, in which planet gears and hermetically sealed hollow drums with inner radial blades are fitted on freely rotating axles, is mounted on a drive shaft. The drums are partly filled with a fluid. The planet gears are engaged inside a ring gear, which is secured on a driven shaft. When the angle velocity of the drive shaft is higher than that of the driven shaft the planet gears together with the drums rotate with respect to the carrier (i.e. perform compound plane motion). In this case the fluid in the drums is subjected three inertial forces, namely centrifugal transporting, centrifugal relative and Coriolis forces. Under the action of the three forces the fluid escapes drum cells next to the drive shaft and, across the drum, enters cells remote from the drive shaft. Thus a part of drum cells remains unfilled with the fluid. When the planet gears and drums rotate with respect to the carrier drum cells remote from the drive shaft and filled with the fluid draw nearer to the drive shaft. This approach is prevented with the sum of above mentioned inertial forces. The sum of these forces creates the pressure of the fluid on drum blades in cells filled with a fluid. This pressure is transformed into a tangential force, its direction coinciding with the direction of the drive shaft rotation. The tangential force is transferred with axles from the drums to the planet gears, and from the planet gears to the ring gear. Thus the torque on the driven shaft is produced.

In the case when the angle velocity of the drive shaft is higher than that of the driven shaft the excessive power at the drive shaft is converted to heat as a result of the inelastic impact of the fluid on drum walls and blades.

When the angle velocities of the drive and driven shafts are equal the carrier with the planet gears and drums and the ring gear rotate as a unit. The fluid under an applied centrifugal force accumulates in drum segments remote from the drive shaft. The antitorque moment at the driven shaft (i.e. at the ring gear) strives for turning the planet gears and drums so that to draw filled with a fluid drum segments nearer to the drive shaft. The centrifugal force prevents this movement and produces the torque at the driven shaft. There are no losses of the power in this case and the coupling operates with 100% efficiency.

For preventing the driven shaft from rotating at the angular velocity higher than that of the drive shaft an overrunning coupling has been situated between the carrier and the ring gear.

BRIEF DESCRIPTION OF THE DRAWINGS

FIG. 1 is the longitudinal section of the coupling.

FIG. 2 is a view at the coupling from the drive shaft.

FIG. 3 is a view at the coupling from the driven shaft.

FIG. 4 is the cross-section 4—4 of the coupling. The engagement of the planet gears with the ring gear is shown.

FIG. 5 is the drum cross-section 5—5. The approximate fluid circulation in the drum (see arrows) in the coordinate system connected with the carrier at an angular velocity of the driven shaft lower than that of the drive shaft.

FIG. 6 is the drum cross-section 5—5. The approximate fluid distribution in the drum in the coordinate system connected with the carrier when angular velocities of the drive and driven shafts are equal.

DESCRIPTION OF THE PREFERRED EMBODIMENT

The coupling consists of the compound carrier 2–13, 16, 17 mounted on the drive shaft 1 and the ring gear 14 mounted on the driven shaft 15. The compound carrier consist of the drive flange 2 secured to the bosses 3 of the carrying disc 4. The disc 4 is connected with the supporting disc 6 by means of the bosses 5. The supporting disc 6 has the aligning shaft 16 freely rotating in the ring gear 14. The journal bearings 7 and 8 are fitted in the carrying disc 4 and supporting disc 6. The axles 9 freely rotate in the journal bearings 7 and 8. The planet gears 10 and the hermetically sealed drums 11 are mounted on each axle 9. Each drum 11 with inner radial blades 12 arranged uniformly on its circumference is partly filled with a fluid 13. The planet gears 10 are engaged with the ring gear 14. All the compound system called a carrier rotates inside the ring gear 14. The ring gear 14 is mounted on the driven shaft 15. The overrunning coupling 17 is situated between the bosses of the carrying disc 4 and the ring gear 14.

The process of transferring a torque from the drive shaft 1 to the driven shaft 15 is shown in FIGS. 1, 2, 5 for the case when the angle velocity of the driven shaft 15 is lower than that of the drive shaft 1, the rotation directions of the shafts being shown in FIG. 1 (for example clockwise). In this case the angle velocity of the ring gear 14 is lower than that of the carrier so the engaged with the ring gear 14 the planet gears 10 together with axles 9 and drums 11 perform relative rotation counterwise. In the absolute coordinate system the planet gears 10 together with the drums 11 perform compound plane motion. In the process of this motion a fluid 13 in the drums under applied centrifugal transporting, centrifugal relative and Coriolis forces strives to occupy right and left remote from the drive shaft 1 segments of the drums. In the coordinate system connected with the carrier the drums 11 rotate counterclockwise. So radial blades 12 carry along the fluid 13 into right and left next to the drive shaft 1 segments of the drums 11. Under applied centrifugal transporting, centrifugal relative and Coriolis forces the fluid 13 escapes interblade cells in right and left next to the drive shaft 1 segments of the drums 11 and, across the hollow drums, enters interblade cells in right remote from the drive shaft 1 segments of the drums 11 (see FIG. 5, arrows). This circulation in the coordinate system connecting and rotating with the carrier is shown in FIG. 5. Right segments of the drums 11 are filled with a fluid 13 only partly. Such an asymmetrical filling of the drums leads to unbalancing the sum of the inertial forces applied to the blades 12. Centrifugal transporting forces are not balanced and summerized into a total tangential force striving to turn the drums 11 in the direction of the drive shaft 1 rotation. Thus a torque is produced at each drum 11. The torque is transferred onto the planet gears 10 with the axles 9. The planet gears 10 strive for turning the ring gear 14 in the direction of the drive shaft rotation and the ring gear 14 strives for turning the driven shaft 15 in the same direction. Thus the torque is transferred from the drive shaft 1 to the driven shaft 15.

The transfer of the torque from the drive shaft 1 to the driven shaft 15 when the angle velocities of the drive and driven shafts are equal is shown in FIGS. 1, 2 and 6. In this case all components of the coupling rotate as a unit. When there is no antitorque at the driven shaft 15 the fluid 13 is arranged symmetrically in remote from the drive shaft 1 right and left segments of the drums 11 under an applied centrifugal force. When a certain antitorque moment is applied to the driven shaft 15 the ring gear 14 turns the planet gears 10 together with the drums 11 at a certain angle counterclockwise (if the drive and driven shafts rotate clockwise). Some part of the fluid 13 is carried away with blades 12 from remote from the drive shaft 1 right segments to next to the drive shaft 1 left segments of the drums 11. The dissymmetrical filling of the drums 11 with the fluid occurs, see FIG. 6. Under an applied centrifugal force unbalanced forces arise in the fluid 13 in left segments of the drums 11. These unbalanced forces are applied to the blades 12. They are sumed into a total tangential force which transfers the torque from the drive shaft 1 to the driven shaft 15 in the way explained above.

To avoid the rotation of the driven shaft 15 at angle velocities higher than those of the drive shaft 1 the overrunning coupling 17 is fitted between the bosses of the carrying disc 4 and the ring gear 14.

What I claim is:

1. A planetary fluid dynamic coupling comprising:

(A) a drive shaft,
 (B) a driven shaft,
 (C) a ring gear fixedly secured to said driven shaft,
 (D) a compound carrier including:
  (1) a drive flange fixedly secured to said drive shaft,
  (2) a carrying disc with first, second and third bosses, the carrying disc being fixedly secured to said drive flange through said first bosses,
  (3) a supporting disc fixedly secured to said carrying disc through said second bosses,
 (E) planetary elements mounted on said carrying and supporting discs and including:
  (1) journal bearings fixedly secured to said carrying and supporting discs,
  (2) axles freely rotating in said journal bearings,
  (3) planetary gears fixedly secured to said axles and engaged with said ring gear,
  (4) hermetically sealed hollow drums adapted for containing liquid, each drum having a plurality of radial blades fast therewith and equally spaced around its internal periphery, the drums being fixedly secured to the ends of said axles and partly filled with a fluid, the fluid in said drums being subjected to inertial forces when said planetary element is in motion and generating a torque on said blades of said drums which is transmitted onto said planetary gears through said axles and therefrom onto said ring gear, i.e. said driven shaft,
 (F) an overrunning coupling placed between said third bosses of said carrying disc and said ring gear for preventing said driven shaft from rotating at an angular velocity higher than that of said drive shaft.

2. A planetary fluid dynamic coupling as set forth in claim 1 wherein said hermetically sealed hollow drums are partly filled with a mixture of two fluids of very different specific weights.

3. A planetary fluid dynamic coupling as set forth in claim 1 wherein said planetary gears are located between carrying and supporting discs.

4. A planetary fluid dynamic coupling as set forth in claim 1 wherein said hermetically sealed drums partly filled with a fluid are axially disposed outside said carrying disc.

* * * * *